United States Patent
Song

(10) Patent No.: US 9,881,977 B2
(45) Date of Patent: Jan. 30, 2018

(54) FLEXIBLE SCREEN AND BEND IDENTIFYING METHOD THEREOF, FLEXIBLE DISPLAY APPARATUS

(71) Applicant: Boe Technology Group Co., Ltd., Beijing (CN)

(72) Inventor: Song Song, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 23 days.

(21) Appl. No.: 14/768,793

(22) PCT Filed: Jan. 5, 2015

(86) PCT No.: PCT/CN2015/070082
§ 371 (c)(1),
(2) Date: Mar. 31, 2016

(87) PCT Pub. No.: WO2016/045243
PCT Pub. Date: Mar. 31, 2016

(65) Prior Publication Data
US 2016/0254328 A1 Sep. 1, 2016

(30) Foreign Application Priority Data
Sep. 24, 2014 (CN) .......................... 2014 1 0494016

(51) Int. Cl.
*G01R 27/08* (2006.01)
*H01L 27/32* (2006.01)
(Continued)

(52) U.S. Cl.
CPC ............ *H01L 27/3225* (2013.01); *G01B 7/18* (2013.01); *G02F 1/13* (2013.01); *H01L 51/0097* (2013.01);
(Continued)

(58) Field of Classification Search
CPC .......... G06F 1/00; G06F 2101/00; G09G 1/00; G09G 2230/00
See application file for complete search history.

(56) References Cited

U.S. PATENT DOCUMENTS

| 9,007,315 B2 * | 4/2015 | Kim ...................... G06F 3/0414 178/18.05 |
| 2010/0201633 A1 * | 8/2010 | Mozdzyn ................ G06F 3/045 345/173 |

(Continued)

FOREIGN PATENT DOCUMENTS

| CN | 101403839 | 4/2009 |
| CN | 101408827 | 4/2009 |

(Continued)

OTHER PUBLICATIONS

Office Action from China Application No. 201410494016.2 dated Dec. 13, 2016.
(Continued)

*Primary Examiner* — Jermele M Hollington
*Assistant Examiner* — Temilade Rhodes-Vivour
(74) *Attorney, Agent, or Firm* — Calfee, Halter & Griswold LLP

(57) ABSTRACT

An embodiment of the present invention relates to the technical field of display. Particularly, there is provided a flexible screen and a bend identifying method thereof, as well as a flexible display apparatus. The flexible screen comprises a first flexible substrate and a second flexible substrate which are oppositely disposed; the flexible screen further comprises a first electrode which is disposed on one side close to the second flexible substrate of the first flexible substrate and a second electrode which is disposed on one side close to the first flexible substrate of the second flexible substrate, as well as a detection system connected with the first electrode or the second electrode; wherein the first (Continued)

electrode and the second electrode are configured to be in positional correspondence; in a case where the flexible screen is bent, the first electrode and the second electrode are electrically connected. The present invention is used for fabrication of a display apparatus. The present invention may be used for determining whether the flexible screen is excessively bent or flexed.

12 Claims, 3 Drawing Sheets

(51) Int. Cl.
*G02F 1/13* (2006.01)
*G01B 7/16* (2006.01)
*H01L 51/00* (2006.01)
*H01L 51/52* (2006.01)
*G06F 1/00* (2006.01)
*G09G 3/00* (2006.01)

(52) U.S. Cl.
CPC ............ *H01L 51/5203* (2013.01); *G06F 1/00* (2013.01); *G06F 2101/00* (2013.01); *G09G 3/00* (2013.01); *G09G 2230/00* (2013.01); *G09G 2380/02* (2013.01)

(56) References Cited

U.S. PATENT DOCUMENTS

| | | | | |
|---|---|---|---|---|
| 2011/0140703 A1* | 6/2011 | Chiao | .................. | G01N 27/403 324/438 |
| 2013/0150689 A1* | 6/2013 | Shaw-Klein | ........... | G01N 27/30 600/345 |
| 2013/0300677 A1* | 11/2013 | Kim | ...................... | G06F 3/0414 345/173 |
| 2014/0015745 A1 | 1/2014 | Chae et al. | | |
| 2014/0204285 A1* | 7/2014 | Jang | ........................ | G06F 3/044 349/12 |
| 2015/0022732 A1* | 1/2015 | Park | ........................ | G06F 3/044 349/12 |

FOREIGN PATENT DOCUMENTS

| | | |
|---|---|---|
| CN | 102097047 | 6/2011 |
| CN | 102097048 | 6/2011 |
| CN | 103365568 | 10/2013 |
| CN | 103383951 | 11/2013 |
| CN | 103389822 | 11/2013 |
| CN | 103901677 | 7/2014 |
| CN | 103985739 | 8/2014 |
| JP | 2006106603 | 4/2006 |
| JP | 2006330082 | 12/2006 |
| KR | 20140022180 | 2/2014 |
| KR | 20140023066 | 2/2014 |
| KR | 20140099164 | 8/2014 |
| WO | 2014/027796 | 2/2014 |

OTHER PUBLICATIONS

Office action from Chinese Application No. 201410494016.2 dated Sep. 20, 2016.

International Search Report and Written Opinion from PCT/CN15/070082 dated Jun. 29, 2015.

Office action from Chinese Application No. 201410494016.2 dated Mar. 29, 2016.

\* cited by examiner

FLEXIBLE SCREEN AND BEND IDENTIFYING METHOD THEREOF, FLEXIBLE DISPLAY APPARATUS

TECHNICAL FIELD

The present application is the U.S. national phase entry of PCT/CN2015/070082, with an international filing date of Jan. 5, 2015, which claims the benefit of Chinese Patent Application No. 201410494016.2, filed on Sep. 24, 2014, the entire disclosures of which are incorporated herein by reference.

BACKGROUND ART

A flexible screen has many advantages, such as being light and thin, durable, bendable and the like, and has become a new-generation promising screen in the field of display. However, current flexible screens also have many technical problems. For example, although the flexible screen may be bent, it can not be excessively bent or flexed due to its limited bending radian.

Based on the above description, when the flexible screen is excessively bent or flexed, problems such as poor display may be caused. Therefore, determining whether the flexible screen is excessively bent or flexed is one of technical problems to be solved in the field of flexible displays.

SUMMARY OF THE INVENTION

An embodiment of the present invention provides a flexible screen and a bend identifying method thereof, which may determine whether the flexible screen is excessively bent or flexed.

To achieve the above objective, the embodiment of the present invention employs the following technical solution:

According to one aspect, there is provided a flexible screen, comprising a first flexible substrate and a second flexible substrate which are oppositely disposed; the flexible screen further comprises a first electrode which is disposed on one side close to the second flexible substrate of the first flexible substrate, and a second electrode which is disposed on one side close to the first flexible substrate of the second flexible substrate, as well as a detection system connected with the first electrode or the second electrode; wherein the first electrode and the second electrode are configured to be in positional correspondence; in a case where the flexible screen is bent, the first electrode and the second electrode are electrically connected.

Alternatively, the first electrode comprises a plurality of first sub-electrodes, and there is no electrical connection among the plurality of first sub-electrodes; or, the second electrode comprises a plurality of second sub-electrodes, and there is no electrical connection among the plurality of second sub-electrodes.

Preferably, in a case where the first electrode comprises a plurality of first sub-electrodes, each of the first sub-electrodes comprises a first strip sub-electrode and a first dentate sub-electrode which is positioned on one side facing away from the first flexible substrate of the first strip sub-electrode and electrically connected with the first strip sub-electrode; the second electrode comprises a second strip electrode and a second dentate electrode which is positioned on one side facing away from the second flexible substrate of the second strip electrode and electrically connected with the second strip electrode.

Further preferably, the first dentate sub-electrode and the second dentate electrode are in one-to-one correspondence.

Further, a cross section shape of the first dentate sub-electrode or the second dentate electrode comprises any one of a rectangle, a trapezoid and a semi-circle.

Preferably, in a case where the second electrode comprises a plurality of second sub-electrodes, each of the second sub-electrodes comprises a second strip sub-electrode and a second dentate sub-electrode which is positioned on one side facing away from the second flexible substrate of the second strip sub-electrode and electrically connected with the second strip sub-electrode; the first electrode comprises a first strip electrode and a first dentate electrode which is positioned on one side facing away from the first flexible substrate of the first strip electrode and electrically connected with the first strip electrode.

Further preferably, the first dentate electrode and the second dentate sub-electrode are in one-to-one correspondence.

Further, a cross section shape of the first dentate electrode or the second dentate sub-electrode comprises any one of a rectangle, a trapezoid and a semi-circle.

Alternatively, the first electrode and the second electrode are both disposed in a peripheral region of the flexible screen.

Alternatively, the flexible screen further comprises a support column disposed between the first flexible substrate and the second flexible substrate; wherein the thickness of the support column is greater than the sum of the thicknesses of the first flexible substrate and the second flexible substrate.

According to another aspect, there is provided a flexible display apparatus, comprising the above flexible screen.

According to yet another aspect, there is provided a bend identifying method of a flexible screen, the method comprises: applying a first voltage value to a first electrode on a first flexible substrate; applying a second voltage value to a second electrode on a second flexible substrate; obtaining a current, the current is a current produced by an electrical connection between the first electrode and the second electrode under a condition that the flexible screen is bent; wherein the first voltage value is unequal to the second voltage value.

Preferably, the applying a first voltage value to a first electrode on a first flexible substrate specifically comprises: applying first unequal sub-voltage values to a plurality of first sub-electrodes of the first electrode, wherein each of the first sub-voltage values is unequal to the second voltage value; or, the applying a second voltage value to a second electrode on a second flexible substrate specifically comprises: applying second unequal sub-voltage values to a plurality of second sub-electrodes of the second electrode, wherein each of the second sub-voltage values is unequal to the first voltage value.

The embodiment of the present invention provides a flexible screen and a bend identifying method thereof, as well as a flexible display apparatus. The flexible screen comprises a first flexible substrate and a second flexible substrate which are oppositely disposed; the flexible screen further comprises a first electrode which is disposed on one side close to the second flexible substrate of the first flexible substrate, and a second electrode which is disposed on one side close to the first flexible substrate of the second flexible substrate, as well as a detection system connected with the first electrode or the second electrode; wherein the first electrode and the second electrode are configured to be in positional correspondence; in a case where the flexible screen is bent, the first electrode and the second electrode are electrically connected.

Based on this, in a case where the flexible screen is excessively bent or flexed, at a position corresponding to this excessively bent region or excessively flexed region, the first electrode and the second electrode may come into contact to realize an electrical connection therebetween, thereby producing a current; since the first electrode or the second electrode is connected with the detection system, this current signal is identified by the detection system, thereby determining that the flexible screen is excessively bent or flexed.

BRIEF DESCRIPTION OF THE DRAWINGS

In order to illustrate the technical solution of embodiments provided by the present invention or the prior art more clearly, the drawings used in the description of the embodiments or the prior art will be briefly described in the following. It is obvious that the drawings in the following description are only related to some embodiments of the present invention. Those of ordinary skilled in the art may also obtain other variations according to these drawings without any inventive work.

DETAILED DESCRIPTION OF THE INVENTION

The technical solutions of embodiments provided by the present invention will be described in a clearly and fully understandable way in connection with the drawings. It is obvious that the described embodiments are just a part but not all of the embodiments provided by the present invention. Based on the embodiments of the present invention, those of ordinary skilled in the art can obtain all other embodiments without any inventive work, all of which should fall within the protective scope of the present invention.

Figure 1:
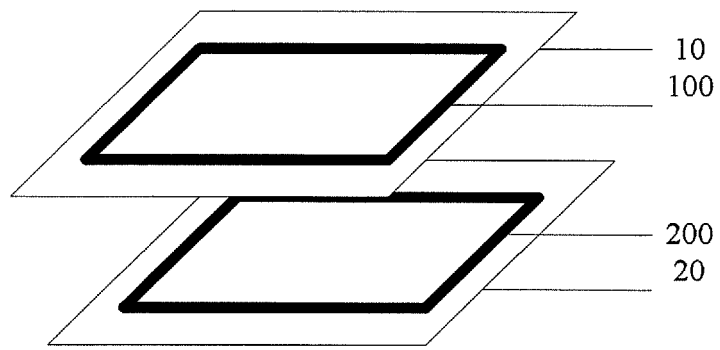
FIG. 1 is a schematic structural view I of a flexible screen provided by an embodiment of the present invention.

An embodiment of the present invention provides a flexible screen, as shown in FIG. 1, comprising a first flexible substrate 10 and a second flexible substrate 20 which are oppositely disposed; the flexible screen further comprises a first electrode 100 which is disposed on one side close to the second flexible substrate 20 of the first flexible substrate 10, and a second electrode 200 which is disposed on one side close to the first flexible substrate 10 of the second flexible substrate 20, as well as a detection system (not shown in the drawing) connected with the first electrode 100 or the second electrode 200; wherein the first electrode 100 and the second electrode 200 are configured to be in positional correspondence; in a case where the flexible screen is bent, the first electrode 100 and the second electrode 200 are electrically connected.

It should be noted that, firstly, materials of the first flexible substrate 10 and the second flexible substrate 20 may comprise one or more of polyethylene (PE), polypropylene (PP), polystyrene (PS), polyethylene terephthalate (PET), polyethylene naphthalate (PEN) and polyimide (PI).

Based on this, the flexible screen may comprise a flexible organic light emitting diode (OLED) display screen, but is not limited to this; any display screens which may be excessively bent or flexed such that two flexible substrates come into contact are all within a protective scope of the present invention.

Secondly, the first electrode 100 and the second electrode 200 are configured to be in positional correspondence, which is mainly used for ensuring contact between the first electrode 100 and the second electrode 200 when the flexible screen is excessively bent or flexed, thereby avoiding a situation that the first electrode 100 and the second electrode 200 can not come into contact due to non-positional correspondence of the two electrodes.

Thereby, there is no insulating layer in a corresponding region between the first electrode 100 and the second electrode 200; that is to say, no protective layer with an insulating effect exists in opposite sides of the first electrode 100 and the second electrode 200, thus ensuring that the first electrode 100 and the second electrode 200 are electrically connected once being in contact.

Thirdly, the flexible screen, for example, an existing curved display screen, may be bent per se, but the bending degree of the flexible screen has certain restrictions, and may not be freely bent. In the embodiment of the present invention, when we say the flexible screen is bent, it is referred relative to the self bending of the existing display screen, which mainly indicates excessive bending or flexing caused on the basis of normal bending (inherent bending) of the existing flexible screen. Based on this, all situations relating to cases where the flexible screen is bent refer to excessive bending or flexing caused on the basis of normal bending of the flexible screen, which will be not repeated any more hereafter. In addition, it should be noted that, the radius of curvature of the excessive bending may correspond to that of a screen or that defined in a module in which the screen is located. This radius of curvature is related to parameters such as materials, structures and hardness of the screen and the module thereof. Specific to different flexible display screens, this radius of curvature may be varied.

An embodiment of the present invention provides a display screen, comprising a first flexible substrate 10 and a second flexible substrate 20 which are oppositely disposed; the flexible screen further comprises a first electrode 100 which is disposed on one side close to the second flexible substrate 20 of the first flexible substrate 10, and a second electrode 200 which is disposed on one side close to the first flexible substrate 10 of the second flexible substrate 20, as well as a detection system connected with the first electrode 100 or the second electrode 200; wherein the first electrode 100 and the second electrode 200 are configured to be in positional correspondence; in a case where the flexible screen is bent, the first electrode 100 and the second electrode 200 are electrically connected.

Based on this, in a case where the flexible screen is excessively bent or flexed, at a position corresponding to the excessively bent region or excessively flexed region, the first electrode 100 and the second electrode 200 may come into contact to realize an electrical connection therebetween, thereby producing a current; since the first electrode 100 or the second electrode 200 is connected with the detection system, this current signal is identified by the detection system, thereby determining that the flexible screen is excessively bent or flexed.

Figure 2:
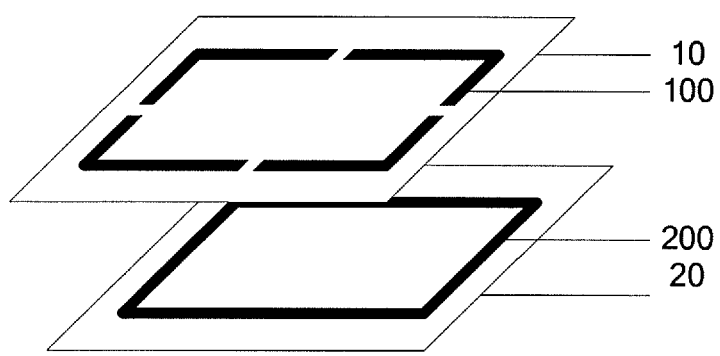
FIG. 2 is a schematic structural view II of a flexible screen provided by an embodiment of the present invention.

Based on the above, preferably, as shown in FIG. 2, the first electrode 100 may comprise a plurality of first sub-electrodes, and there is no electrical connection among the plurality of first sub-electrodes; or, the second electrode 200 may comprise a plurality of second sub-electrodes, and there is no electrical connection among the plurality of second sub-electrodes.

It should be noted that, in a case where the first electrode 100 comprises a plurality of first sub-electrodes, the second electrode 200 may comprise a plurality of second sub-electrodes, or may only comprise an all-connected electrode; similarly, in a case where the second electrode 200 comprises a plurality of second sub-electrodes, the first electrode 100 may comprise a plurality of first sub-electrodes, or may only comprise an all-connected electrode; wherein the accompanying drawings of the present invention are schematically illustrated in a case where the first electrode 100 comprises a plurality of first sub-electrodes and the second electrode 200 only comprises an electrode as an example.

In view of the simplicity for a preparation process, since the objective of the present invention may be achieved by fabricating one of the first electrode 100 and the second electrode 200 as a plurality of sub-electrodes among which no electrical connection exists, the embodiment of the present invention prefers that in a case where one electrode comprises a plurality of sub-electrodes, the other electrode only comprises one electrode.

Here, the flexible screen may be partitioned into a plurality of regions, the number of the first sub-electrodes or the second sub-electrodes may be determined according to the actual number of the above regions, so that each region may comprise one pair of oppositely-disposed electrodes.

Based on this, according to the partitioned regions of the flexible screen, it also needs to dispose a detection system corresponding to each region, while disposing the first sub-electrodes and the second electrode or the first electrode and the second sub-electrodes. Particularly, the detection system may be one same detection system, and the detection system is respectively connected with the first sub-electrodes or the second sub-electrodes in different regions by virtue of wiring.

In this way, when determining whether the flexible screen is excessively bent or flexed, with a case where the first electrode 100 comprises a plurality of first sub-electrodes and the second electrode 200 only comprises one electrode as an example, first different voltage values may be applied to a plurality of first sub-electrodes, and a second voltage value different from any one of the first voltage values may be applied to the second electrode; in this case, since no electrical connection exists among the first sub-electrodes in different regions, when the first sub-electrodes and the second electrode come into contact to produce a current, according to the amount of this current, it will be determined not only that whether the flexible screen is bent, but also the specific region where the flexible screen is bent.

Figure 3:
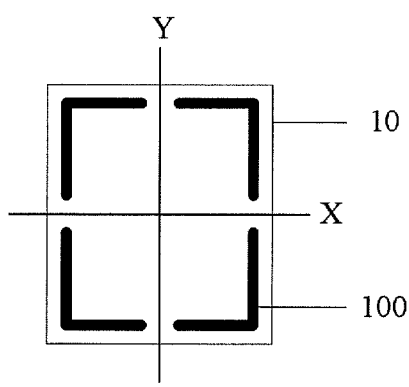
FIG. 3 is a schematic diagram of partitioned regions of a flexible screen provided by an embodiment of the present invention.

Exemplarily, as shown in FIG. 3, with a center of the flexible screen as an origin of coordinate, the flexible screen is partitioned into 2×2 same rectangular regions, that is to say, a first region (a left-upper region), a second region (a right-upper region), a third region (a left-lower region) and a fourth region (a right-lower region). Based on this, if the first sub-electrode and the second electrode in a certain region come into contact to produce a current, the specific region where the flexible screen is bent may be easily identified according to a current signal detected by the detection system; if a plurality of regions simultaneously produce currents, it may determined that contact points are positioned at two ends of a middle axis of the flexible screen, that is to say, the flexible screen is symmetrically bent.

Certainly, a partitioning manner of the flexible screen is not limited to this, and the flexible screen may employ other partitioning manners, which is not specifically defined here. It should be noted that, the finer the partitioned regions of the flexible screen are, the more accurate the determined position where the flexible screen is bent is. Therefore, the flexible screen may be partitioned according to an actual demand. Based on this, in view of a case wherein a region where the flexible screen is excessively bent or flexed is mostly located at a corner position, in general, it is only needed to determine an approximate region where the flexible screen is bent. Therefore, the embodiment of the present invention prefers that the flexible screen is partitioned according to the above partitioning manner.

Figure 4:
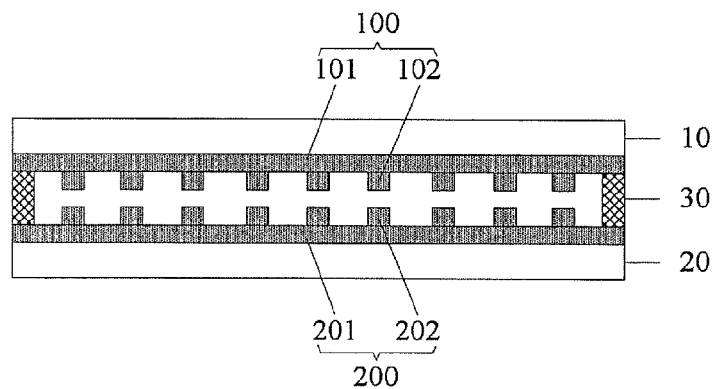
FIG. 4(a) to FIG. 4(c) are cross sectional schematic structural views of a flexible screen provided by an embodiment of the present invention when it is not bent.
Figure 4:
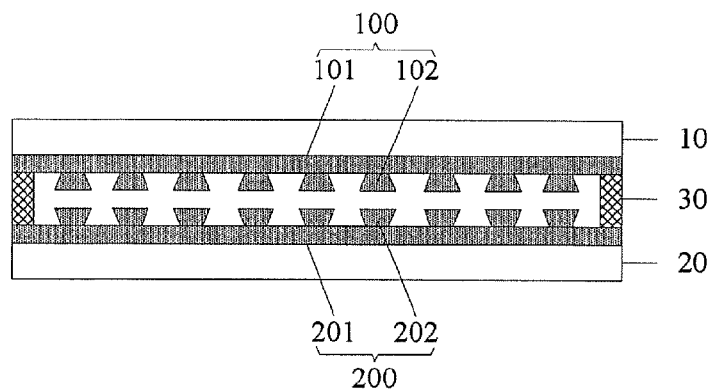
Figure 4:
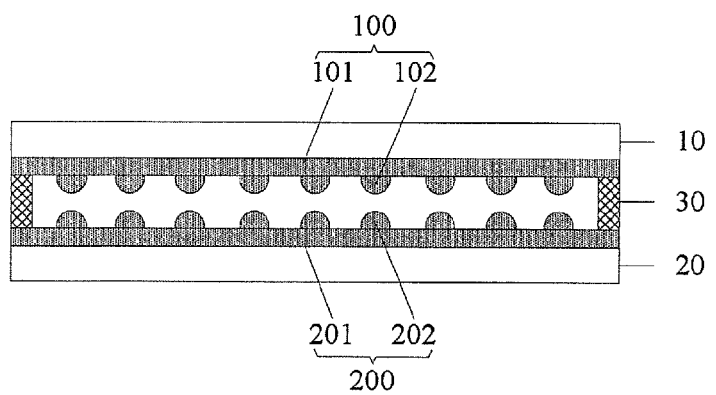
Figure 5:
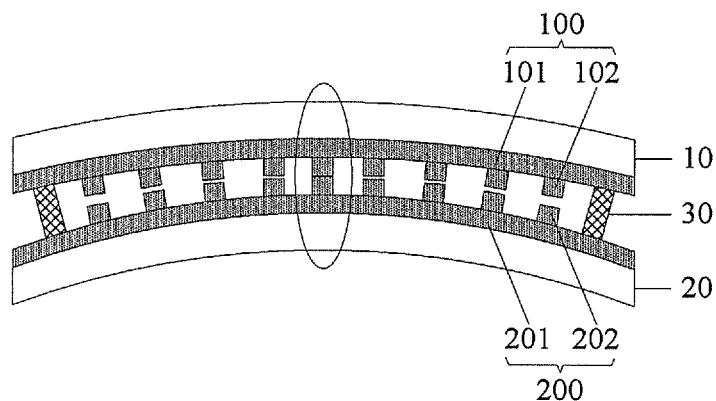
FIG. 5 is a cross sectional schematic structural view of the flexible screen shown in FIG. 4(a) when it is bent.

Based on this, as shown in FIG. 4($a$) to FIG. 4($c$) and FIG. 5, in a case where the first electrode 100 comprises a plurality of first sub-electrodes, each of the first sub-electrodes comprises a first strip sub-electrode 101 and a first dentate sub-electrode 102 which is positioned on one side facing away from the first flexible substrate 10 of the first strip sub-electrode 101 and electrically connected with the first strip sub-electrode 101; the second electrode 200 may comprise a second strip electrode 201 and a second dentate electrode 202 which is positioned on one side facing away from the second flexible substrate 20 of the second strip electrode 201 and electrically connected with the second strip electrode 201. Wherein, the first dentate sub-electrode 102 and the second dentate electrode 202 are in one-to-one correspondence.

Based on this, a cross section shape of the first dentate sub-electrode 102 or the second dentate electrode 202 may comprise any one of a rectangle, a trapezoid and a semi-circle; certainly, it may comprise other shapes, as long as being capable of ensuring that two electrodes come into contact when the flexible screen is bent; the actual shape of the above dentate electrode is not specifically limited by the embodiment of the present invention.

In order to ensure that when the flexible screen is bent, the first dentate sub-electrode 102 and the second dentate electrode 202 come into contact easily so as to result in an electrical connection, opposite surfaces of the first dentate sub-electrode 102 and the second dentate electrode 202 preferably have relatively large area, so that the first dentate sub-electrode 102 and the second dentate electrode 202 may easily come into contact when the flexible screen is bent, and the testing sensitivity is improved.

Alternatively, with reference to FIG. 4($a$) to FIG. 4($c$) and FIG. 5, in a case where the second electrode 200 comprises a plurality of second sub-electrodes, each of the second sub-electrodes may comprise a second strip sub-electrode 201 and a second dentate sub-electrode 202 which is positioned on one side facing away from the second flexible substrate 20 of the second strip sub-electrode 201 and electrically connected with the second strip sub-electrode 201; the first electrode 100 may comprise a first strip electrode 101 and a first dentate electrode 102 which is positioned on one side facing away from the first flexible substrate 10 of the first strip electrode 101 and electrically connected with the first strip electrode 101. Wherein, the first dentate electrode 102 and the second dentate sub-electrode 202 are in one-to-one correspondence.

Based on this, a cross section shape of the first dentate electrode 102 or the second dentate sub-electrode 202 comprises any one of a rectangle, a trapezoid and a semi-circle; certainly, it may comprise other shapes, as long as being capable of ensuring that two electrodes come into contact when the flexible screen is bent; the actual shape of the above dentate electrode is not specifically defined by the embodiment of the present invention.

In order to ensure that when the flexible screen is bent, the first dentate electrode 102 and the second dentate sub-electrode 202 come into contact easily so as to result in an electrical connection, opposite surfaces of the first dentate electrode 102 and the second dentate sub-electrode 202 preferably have relatively large area, so that the first dentate electrode 102 and the second dentate sub-electrode 202 easily come into contact when the flexible screen is bent, and the testing sensitivity is improved.

Here, the one-to-one correspondence between the first dentate sub-electrode 102 and the second dentate electrode 202 or the one-to-one correspondence between the first dentate electrode 102 and the second dentate sub-electrode 202 facilitates the implementation of mutual contact between the two electrodes when the flexible screen is bent.

Alternatively, the first electrode 100 and the second electrode 200 may be both disposed in a peripheral region of the flexible screen.

Since the first electrode 100 and the second electrode 200 may be both disposed in the peripheral region of the flexible screen, the display effect of the flexible screen may not be affected; based on this, the first electrode 100 and the second electrode 200 may comprise any one of a transparent electrode or a nontransparent electrode, and certainly may also comprise the above two kinds of electrodes both. Based on this, in view of using the first electrode 100 and the second electrode 200 to produce a current signal when they come into contact, the embodiment of the present invention prefers that the first electrode 100 and the second electrode 200 may both employ a metal electrode with relatively small resistivity.

Further, the flexible screen may further comprise a support column 30 disposed between the first flexible substrate 10 and the second flexible substrate 20; wherein the thickness of the support column 30 is greater than the sum of the thicknesses of the first flexible substrate 10 and the second flexible substrate 20.

Particularly, the purpose for the thickness of the support column 30 being greater than the sum of the thicknesses of the first flexible substrate 10 and the second flexible substrate 20 is to ensure that the first electrode 100 and the second electrode 200 may not come into contact under a normal condition of the flexible screen; here, the normal condition of the flexible screen refers to a design condition of the flexible screen, it may be planar or curved, which is not defined here.

An embodiment of the present invention further provides a flexible display apparatus, comprising the above flexible screen.

Wherein, the flexible display apparatus for example may be a flexible organic light emitting diode device, but is not limited to this; any flexible display apparatuses which may be excessively bent or flexed such that two flexible substrates come into contact are all within a protective range of the present invention.

Figure 6:
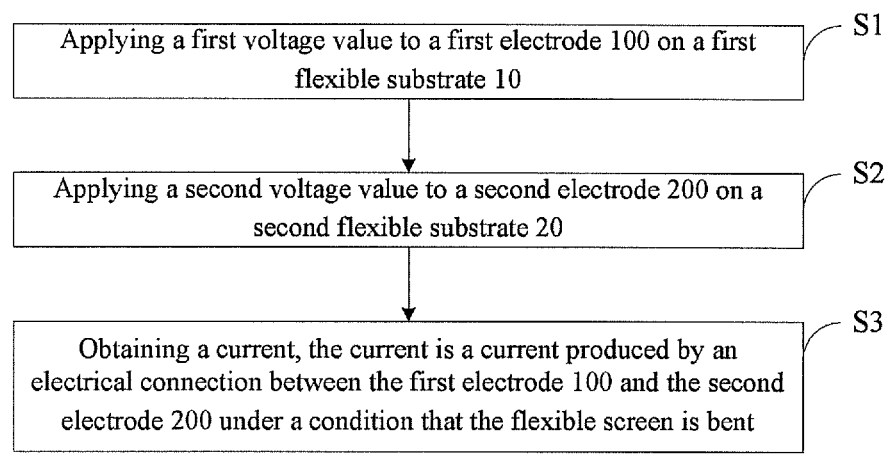
FIG. 6 is a flow diagram for a bend identifying method of a flexible screen provided by an embodiment of the present invention.

An embodiment of the present invention further provides a bend identifying method of a flexible screen, as shown in FIG. 6, the method comprises:

S1. applying a first voltage value to a first electrode 100 on a first flexible substrate 10.

S2. applying a second voltage value to a second electrode 200 on a second flexible substrate 20.

Wherein, the first voltage value is unequal to the second voltage value.

S3. Obtaining a current, the current is a current produced by an electrical connection between the first electrode 100 and the second electrode 200 under a condition that the flexible screen is bent.

Here, the current may be obtained through a detection system connected with the first electrode 100 or the second electrode 200.

By virtue of the above steps S1-S3, whether the flexible screen is excessively bent or flexed may be identified. Particularly, when the flexible screen is excessively bent or flexed, the first electrode 100 and the second electrode 200 may come into contact locally; based on this, since the first electrode 100 and the second electrode 200 have unequal voltage values, a current may be produced due to an electrical connection between the two electrodes when being contact, and may be obtained by the detection system, thereby determining that the flexible screen is excessively bent or flexed.

Based on the above, in a case where the first electrode 100 comprises a plurality of first sub-electrodes and the second electrode 200 only comprises one electrode, first unequal sub-voltage values may be applied to a plurality of first sub-electrodes of the first electrode 100, and a second voltage value may be applied to the second electrode 200; wherein each of the first sub-voltage values is unequal to the second voltage value.

Based on this, by disposing the first electrode 100 as a plurality of first sub-electrodes among which no electrical connection exists and applying unequal voltages to each of the first sub-electrodes, different voltage differences may be produced between each of the first sub-electrodes and the second electrode; in this way, when the first sub-electrode and the second electrode come into contact, different currents may be produced. According to the amount of this current, it may be determined not only that whether the flexible screen is bent, but also the specific region where the flexible screen is bent.

Similarly, in a case where the second electrode 200 comprises a plurality of second sub-electrodes and the first electrode 100 only comprises one electrode, second unequal sub-voltage values may be applied to a plurality of second sub-electrodes of the second electrode 200, and a first voltage value may be applied to the first electrode 100; wherein each of the second sub-voltage values is unequal to the first voltage value.

Based on this, by disposing the second electrode 200 as a plurality of second sub-electrodes among which no electrical connection exists and applying unequal voltages to each of the second sub-electrodes, different voltage differences may be produced between the first electrode and each of the second sub-electrodes; in this way, when the first electrode and the second sub-electrode come into contact, different currents may be produced. According to the amount of this current, it may be determined not only that whether the flexible screen is bent, but also the specific region where the flexible screen is bent.

It should be noted that, the number of the first sub-electrodes or the second sub-electrodes is not specifically limited by the embodiment of the present invention, which may be determined according to the number of the partitioned regions of the flexible screen.

The above merely is detailed description of the present invention, and not intended to limit the protective scope of the present invention. Changes or substitutions will readily occur to any person skilled in the art within the technical scope disclosed by the present invention, and should all be embraced within a protective scope of the present invention. Thus, the protective scope of the present invention should be interpreted solely in light of the claims.

The invention claimed is:

1. A flexible screen, comprising:
a first flexible substrate and a second flexible substrate which are oppositely disposed;
a first electrode which is disposed on one side close to said second flexible substrate of said first flexible substrate and a second electrode which is disposed on one side close to said first flexible substrate of said second flexible substrate; and
a detection system connected with said first electrode or said second electrode, wherein
said first electrode and said second electrode are configured to be in positional correspondence, and in a case where said flexible screen is bent, said first electrode and said second electrode are electrically connected;
said first electrode comprises a plurality of first sub-electrodes, and there is no electrical connection among said plurality of first sub-electrodes;
each of said first sub-electrodes comprises a first strip sub-electrode and a first dentate sub-electrode which is positioned on one side facing away from said first flexible substrate of said first strip sub-electrode and electrically connected with said first strip sub-electrode; and
said second electrode comprises a second strip electrode and a second dentate electrode which is positioned on one side facing away from said second flexible substrate of said second strip electrode and electrically connected with said second strip electrode.

2. The flexible screen according to claim 1, wherein said first dentate sub-electrode and said second dentate electrode are in one-to-one correspondence.

3. The flexible screen according to claim 1, wherein a cross section shape of said first dentate sub-electrode or said second dentate electrode comprises any one of a rectangle, a trapezoid and a semi-circle.

4. The flexible screen according to claim 1, wherein said first electrode and said second electrode are both disposed in a peripheral region of said flexible screen.

5. The flexible screen according to claim 1, wherein said flexible screen further comprises a support column disposed between said first flexible substrate and said second flexible substrate, and
wherein the thickness of said support column is greater than the sum of the thicknesses of said first flexible substrate and said second flexible substrate.

6. A flexible screen, comprising:
a first flexible substrate and a second flexible substrate which are oppositely disposed;
a first electrode which is disposed on one side close to said second flexible substrate of said first flexible substrate and a second electrode which is disposed on one side close to said first flexible substrate of said second flexible substrate; and
a detection system connected with said first electrode or said second electrode, wherein said first electrode and said second electrode are configured to be in positional correspondence, and in a case where said flexible screen is bent, said first electrode and said second electrode are electrically connected;
said second electrode comprises a plurality of second sub-electrodes, and there is no electrical connection among said plurality of second sub-electrodes;
each of said second sub-electrodes comprises a second strip sub-electrode and a second dentate sub-electrode which is positioned on one side facing away from said second flexible substrate of said second strip sub-electrode and electrically connected with said second strip sub-electrode; and
said first electrode comprises a first strip electrode and a first dentate electrode which is positioned on one side facing away from said first flexible substrate of said first strip electrode and electrically connected with said first strip electrode.

7. The flexible screen according to claim 6, wherein said first dentate electrode and said second dentate sub-electrode are in one-to-one correspondence.

8. The flexible screen according to claim 6, wherein a cross section shape of said first dentate electrode or said second dentate sub-electrode comprises any one of a rectangle, a trapezoid and a semi-circle.

9. The flexible screen according to claim 6, wherein said first electrode and said second electrode are both disposed in a peripheral region of said flexible screen.

10. The flexible screen according to claim 6, wherein said flexible screen further comprises a support column disposed between said first flexible substrate and said second flexible substrate, and
wherein the thickness of said support column is greater than the sum of the thicknesses of said first flexible substrate and said second flexible substrate.

11. A bend identifying method of a flexible screen, wherein said method comprises:
applying a first voltage value to a first electrode on a first flexible substrate;
applying a second voltage value to a second electrode on a second flexible substrate;
obtaining a current, said current is a current produced by an electrical connection between said first electrode and said second electrode under a condition that said flexible screen is bent, wherein said first voltage value is unequal to said second voltage value.

12. The method according to claim 11, wherein
said applying a first voltage value to a first electrode on a first flexible substrate specifically comprises: applying first unequal sub-voltage values to a plurality of first sub-electrodes of said first electrode, wherein each of said first sub-voltage values is unequal to said second voltage value; or,
said applying a second voltage value to a second electrode on a second flexible substrate specifically comprises: applying second unequal sub-voltage values to a plurality of second sub-electrodes of said second electrode, wherein each of said second sub-voltage values is unequal to said first voltage value.

* * * * *